United States Patent
Park et al.

(10) Patent No.: US 8,917,333 B2
(45) Date of Patent: Dec. 23, 2014

(54) DIGITAL IMAGE PROCESSING APPARATUS, DIGITAL IMAGE PROCESSING METHOD, AND RECORDING MEDIUM STORING THE DIGITAL IMAGE PROCESSING METHOD

(75) Inventors: Jeong-yong Park, Changwon-si (KR); Soon-geun Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 13/223,574

(22) Filed: Sep. 1, 2011

(65) Prior Publication Data

US 2012/0057070 A1    Mar. 8, 2012

(30) Foreign Application Priority Data

Sep. 2, 2010 (KR) .................. 10-2010-0086177

(51) Int. Cl.
*H04N 5/262* (2006.01)
*H04N 5/232* (2006.01)
*H04N 5/235* (2006.01)

(52) U.S. Cl.
CPC ......... *H04N 5/23212* (2013.01); *H04N 5/2621* (2013.01); *H04N 5/23232* (2013.01); *H04N 5/2356* (2013.01)
USPC .................. 348/239; 348/345; 348/222.1

(58) Field of Classification Search
USPC .......... 348/239, 333.04, 345, 222.1; 382/173, 382/191, 199, 283
See application file for complete search history.

(56) References Cited

U.S. PATENT DOCUMENTS

| | | | |
|---|---|---|---|
| 2003/0090567 A1* | 5/2003 | Sasaki et al. .................. | 348/136 |
| 2007/0140678 A1* | 6/2007 | Yost et al. ..................... | 396/147 |
| 2007/0147820 A1* | 6/2007 | Steinberg et al. ............. | 396/155 |
| 2008/0239104 A1* | 10/2008 | Koh ......................... | 348/240.99 |
| 2008/0316328 A1* | 12/2008 | Steinberg et al. .......... | 348/222.1 |
| 2009/0153695 A1* | 6/2009 | Kikuchi ..................... | 348/222.1 |

* cited by examiner

*Primary Examiner* — Paul Berardesca
(74) *Attorney, Agent, or Firm* — Drinker Biddle & Reath LLP

(57) ABSTRACT

Provided are an image processing method, a digital image processing apparatus, and a recording medium storing the image processing method. The method includes capturing a first image, a second image, and a third image, which are captured with different focuses for the same subject and background; setting a subject portion and a background portion by using the first and second images; and combining the first image for the subject portion and the third image for the background portion with each other to obtain an out-of-focus image.

22 Claims, 17 Drawing Sheets

DIGITAL IMAGE PROCESSING APPARATUS, DIGITAL IMAGE PROCESSING METHOD, AND RECORDING MEDIUM STORING THE DIGITAL IMAGE PROCESSING METHOD

CROSS-REFERENCE TO RELATED PATENT APPLICATION

This application claims the benefit of Korean Patent Application No. 10-2010-0086177, filed on Sep. 2, 2010, in the Korean Intellectual Property Office, the entire disclosure of which is incorporated herein by reference.

BACKGROUND

1. Field of the Invention

The invention relates to a digital image processing apparatus and a digital image processing method for obtaining an out-of-focus images by combining multiple images, and a storage medium storing the digital image processing method.

2. Description of the Related Art

An out-of-focus image is an image where the subject is in focus and the rest of the image is out of focus. Special purpose lenses are manufactured for obtaining out-of-focus images. The special purpose lenses are called long focus lenses which have a shallow focal depth of field (DOF) for obtaining an out-of-focus image. However, such specific purpose lenses may be expensive and may require the user to separately purchase the lens and install the lens on the digital image processing apparatus, which may be a camera. Moreover, a user may have difficulty using such a special purpose lens, and so the user may not be able to successfully obtain an out-of-focus image even with a special purpose lens.

Additionally, it may be particularly difficult to obtain an out-of-focus image with a compact digital still camera (DSC) because an imaging area of the compact camera is narrow due to the slim characteristics of the compact camera. The narrow image area means that the focal distance of the lens becomes short and the DOF becomes deep (which is the opposite of what is needed for an out-of-focus image) with respect to the background.

Users want to obtain out-of-focus images, but the existing technology makes it difficult to obtain out-of-focus images.

SUMMARY

Therefore, there is a need in the art for an image processing method, a digital image processing apparatus, and a recording medium storing the image processing method, the digital image processing apparatus including: a storage unit in which reference subject distance information used to perform out-of-focus image processing according to reference zoom information is stored; a zoom information obtaining unit for obtaining zoom information; a reference subject distance information obtaining unit for obtaining the reference subject distance information corresponding to the zoom information from the storage unit; a notification unit for outputting notification information corresponding to the reference subject distance information; an image generating unit for generating a first image in which a subject is focused, a second image in which a background is focused, and a third image that is not focused; a setting unit for setting a subject region and a background region of each of the first image and the second image; and an out-of-focus image generating unit for generating an out-of-focus image by combining the subject region with the first image and combining the background region with the third image.

According to another aspect of the invention, there is provided a digital image processing method including: obtaining zoom information; obtaining reference subject distance information corresponding to the zoom information obtained from a database of reference subject distance information used to perform out-of-focus image processing according to reference zoom information; outputting notification information corresponding to the reference subject distance information; generating a first image in which a subject is focused, a second image in which a background is focused, and a third image that is not focused; setting a subject region and a background region of each of the first image and the second image; and generating an out-of-focus image by combining the subject region with the first image and combining the background region with the third image.

According to another aspect of the invention, a digital image processing apparatus is provided. The digital image processing apparatus including an image generating unit configured to generate a first image in which a subject is focused, and a second image in which a background is focused; a setting unit configured to set a subject region and a background region of each of the first image and the second image; and an out-of-focus image generating unit configured to generate an out-of-focus image by combining the subject region of the first image with the background region of the third image.

According to another aspect of the invention, there is provided a computer readable recording medium having embodied thereon a program for executing the digital image processing method.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
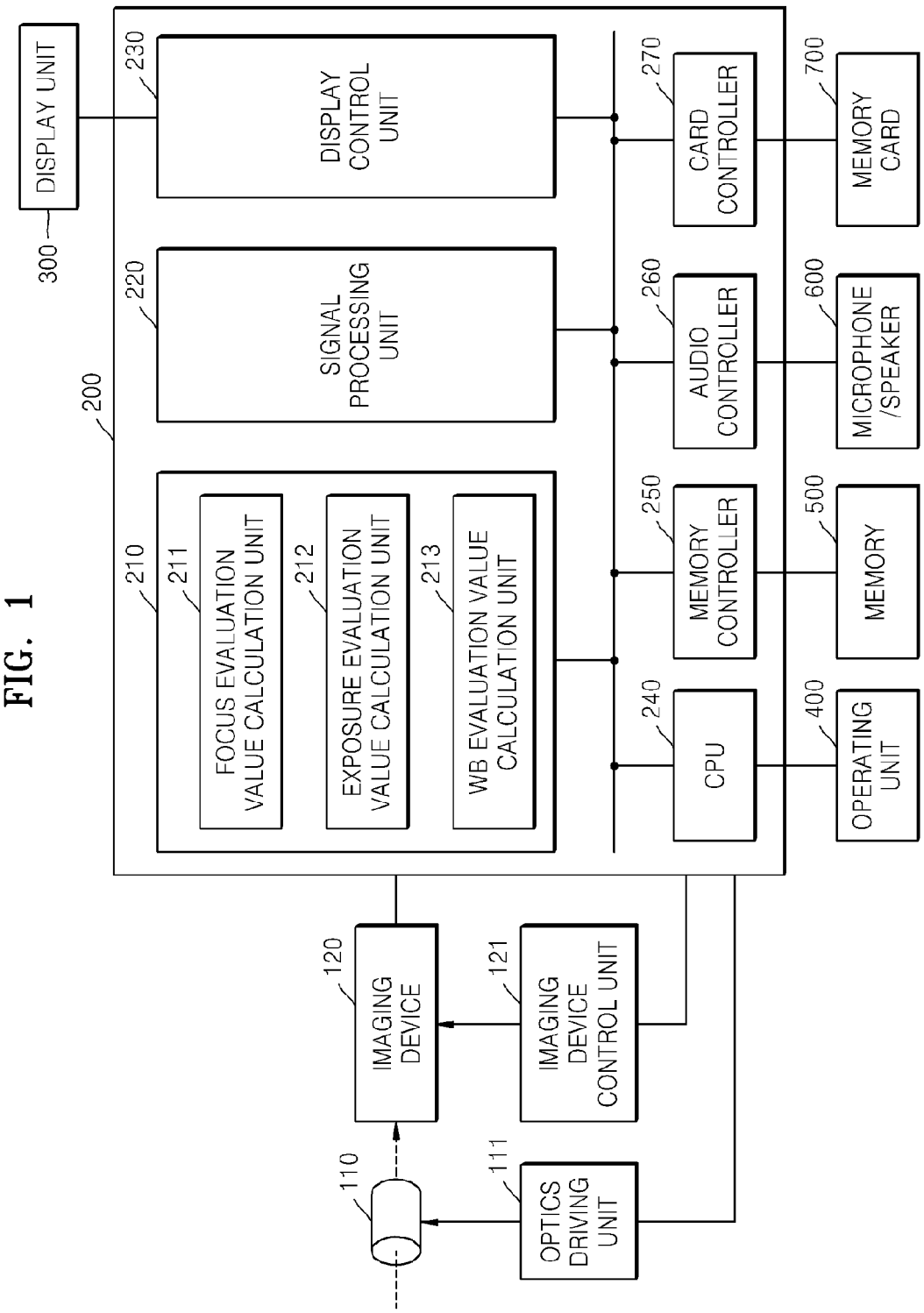
FIG. 1 is a block diagram illustrating a digital image signal processing apparatus according to an embodiment of the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

FIG. 1 is a block diagram of a digital image signal processing apparatus according to an embodiment of the invention.

As an example of the digital image processing apparatus, a digital single-lens reflex camera will be described. However, the digital image processing apparatus of the invention is not limited to the digital camera shown in FIG. 1, and the invention may be applied to digital appliances such as interchangeable lens digital cameras, camera phones, personal digital assistants (PDAs), or portable multimedia players (PMPs), etc.

The digital single-lens reflex camera according to the current embodiment includes an optics 110, an optics driving unit 111, an imaging device 120, an imaging device control unit 121, a digital signal processor (DSP) 200, a display unit 300, an operating unit 400, a memory 500, a microphone/speaker 600, and a memory card 700.

The optics 110 may include a lens for concentrating optical signals, an iris for controlling an amount of the optical signals, and a shutter for controlling input of the optical signals. The lens includes a zoom lens for narrowing or widening a picture angle according to focal lengths and a focus lens for focusing on an object. Each of the lenses as stated above may be either an individual lens or a collection of a plurality of lenses. The shutter may be a mechanical shutter, in which a cover moves up and down. Alternatively, supply of electric signals to the imaging device 120 may be controlled instead of arranging a shutter unit.

The optics driving unit 111 for driving the optics 110 may perform relocation of the lens, opening/closing of the iris, and operation of the shutter for performing operations, such as auto-focusing, auto-exposure, iris controlling, zooming, and focus changing. The optics driving unit 111 may receive a control signal from the DSP 200 and control the optics 110 according to the control signal. In particular, the optics driving unit 111 of the current embodiment may include an AF motor that drives the focus lens to perform automatic focusing (AF).

The imaging device 120 includes a photoelectric conversion device that receives an optical signal input via the optics 110 and converts the optical signal to an electric signal. Examples of the photoelectric conversion device are a charge-coupled device (CCD) sensor array and a complementary metal-oxide semiconductor (CMOS) sensor array. Furthermore, the imaging device 120 may include a correlated double sampling (CDS)/amplifier (AMP) that eliminates low frequency noises included in an electric signal output by the imaging device 120 and amplifies the electric signal to a predetermined level. Furthermore, the imaging device 120 may further include an analog-digital (AD) converter that performs digital conversion on an electric signal output by the CDS/AMP to generate a digital signal. Although the imaging device 120 and the components stated above are included in a single block, that is, the components are included in the imaging device 120 in the current embodiment, the invention is not limited thereto, and the imaging device 120 and the components stated above may be either included in separate blocks or included in the DSP 200.

The optics driving unit 111 and the imaging device control unit 121 may be controlled according to a timing signal supplied by a timing generator (TG). Although not shown, the TG may be included in the DSP 200. However, the invention is not limited thereto. For example, in a digital single lens reflex (DSLR) camera, the TG may be arranged in a lens unit attached to a body.

The TG outputs a timing signal to the imaging device 120 to control a period of time for exposure of each of pixels of the photoelectric conversion device or control read-out of electric charges. Therefore, the imaging device 120 may provide image data corresponding to a frame image according to a timing signal provided by the TG.

An image signal provided by the imaging device 120 is input to a pre-processing unit 210 of the DSP 200. The pre-processing unit 210 includes a focus evaluation value calculation unit 211 that calculates a focus evaluation value for AF, an exposure evaluation value calculation unit 212 that calculates an automatic evaluation value for automatic exposure (AE), and a white balance (WB) evaluation value calculation unit 213 that calculates a WB evaluation value for automatic white balance (AWB).

The CPU 240 performs operations on the calculated exposure evaluation value and/or the WB evaluation value. The processed exposure evaluation value and/or the WB evaluation value are feedback to the imaging device control unit 121. The imaging device 120 obtains an image signal with a suitable color output and a suitable exposure level. Further, opening/closing of the iris and shutter speed may be controlled by driving an iris driving motor and a shutter driving motor of the optics driving unit 111. Furthermore, the CPU 240 performs operation on the focus evaluation value and the optics driving unit 111 outputs a result of the operation, so that the focus lens may move in an optical axis. Therefore, AWB, AE, and AF may be performed and applied by a selection of a user.

A signal processing unit 220 performs predetermined image signal processes on an image signal to display or record the image signal. For example, the signal processing unit 220 performs image signal processes on an image signal to convert the image signal into a form suitable for human vision, e.g., gamma correction, color filter array interpolation, color matrix, color correction, and color enhancement. Furthermore, the signal processing unit 220 also performs resizing process for adjusting the size of an image.

Further, the signal processing unit 220 performs signal processing for performing a particular function. The signal processing unit 220 may perform signal processing for detecting a desired scene or object with respect to the image signal. The signal processing unit 220 may detect the desired scene or object by using color components, edge components, and characteristic points of the image signal. The signal processing unit 220 may detect a face of the subject and detect a face region including the detected face. Further, the signal processing unit 220 may perform compression and expansion on the image signal on which the image signal processing has been performed. For example, the signal processing unit 220 compresses the image signal into a compression format, such as a JPEG compression format or H.264 compression format. An image file including image data generated by compressing the image signal is transmitted to the memory card 700 through a card controller 270 and is stored therein.

The signal processing unit 220 generates an out-of-focus image. This will be described in more detail with reference to FIGS. 2 and 3.

Meanwhile, the DSP 200 includes a display control unit 230. The display control unit 230 controls the display unit 300 to display an image and/or various types of information. The display unit 300 may include a liquid crystal display (LCD) device, a light-emitting diode (LED) display device, an organic light-emitting display (OLED) device, etc. In particular, the display unit 300 may display notification information used to guide a generation of the out-of-focus image. Alternatively, the display unit 300 may display notification information regarding whether to generate the out-of-focus image. The notification information may be displayed on the display unit 300 that is at least one of previously stored user interfaces (UIs).

The CPU 240 may perform operations according to programs stored in the memory 500 and control an operation of each constituent. The CPU 240 may further control an output of the notification information used to generate the out-of-focus image. This will be described in more detail with reference to FIGS. 2 and 3.

Meanwhile, the digital camera includes the operating unit 400, via which control signals of the user are input. The operating unit 400 may include a component used to operate the digital image photographing apparatus and perform various photographing settings. For example, the operating unit 400 may be embodied as buttons, keys, a touch panel, a touch screen, or a dial, and user control signals for various functions, such as turning power on/off, starting/stopping photographing, starting/stopping/searching playback, driving optics, switching mode, operating menus, and operating selections, may be input via the operating unit 400. For example, a shutter button may be half-pressed, fully pressed, or released by a user. An operation signal for starting focus control is output when a shutter button is half-pressed (S1), and the focus control is terminated when the shutter button is released. The shutter button may output an operation signal for starting photographing when the shutter button is fully pressed (S2). The operation signals may be transmitted to the CPU 240 of the DSP 200, and thus corresponding components may be driven.

The DSP 200 includes an audio controller 260. The audio controller 260 controls sound information input through the microphone/speaker 600 to be converted into an audio signal so that the microphone/speaker 600 inputs or outputs the audio signal. In particular, the audio controller 260 may control the microphone/speaker 600 to output the notification information as audio signals.

The DSP 200 includes a memory controller 250 that controls the memory 500 that temporarily records data such as a captured image or image information. In addition, the DSP 200 includes a card controller 270 that records or reads the captured image in the memory card 700. The card controller 270 controls writing of image data in the memory card 700 or reading of the image data or setting information recorded in the memory controller 250.

The memory 500 may include a program storage unit for storing an operating system (OS) and application programs for operating the digital photographing apparatus. Examples of the program storage unit may be an EEPROM, a flash memory, and a ROM. Furthermore, the memory 500 may include a buffer memory for temporarily storing image data of a captured image. Examples of the buffer memory may be a SDRAM or a DRAM. The memory 500 may store image data of a plurality of images in sequential, and may output image signals in the sequential/predetermined order during focus control. Furthermore, the memory 500 may include a display memory having at least one. The display memory may simultaneously input and output image data to and from a display driving unit included in the display unit 300. The size and the maximum number of colors of the display unit 300 depend on the capacity of the display memory.

The memory card 700 may be attached to and detached from the digital photographing apparatus, and may be an optical disc (a CD, a DVD, a Blu-ray disc, or the like), an optical-magnetic disk, a magnetic disk, or a semiconductor memory.

Figure 2:
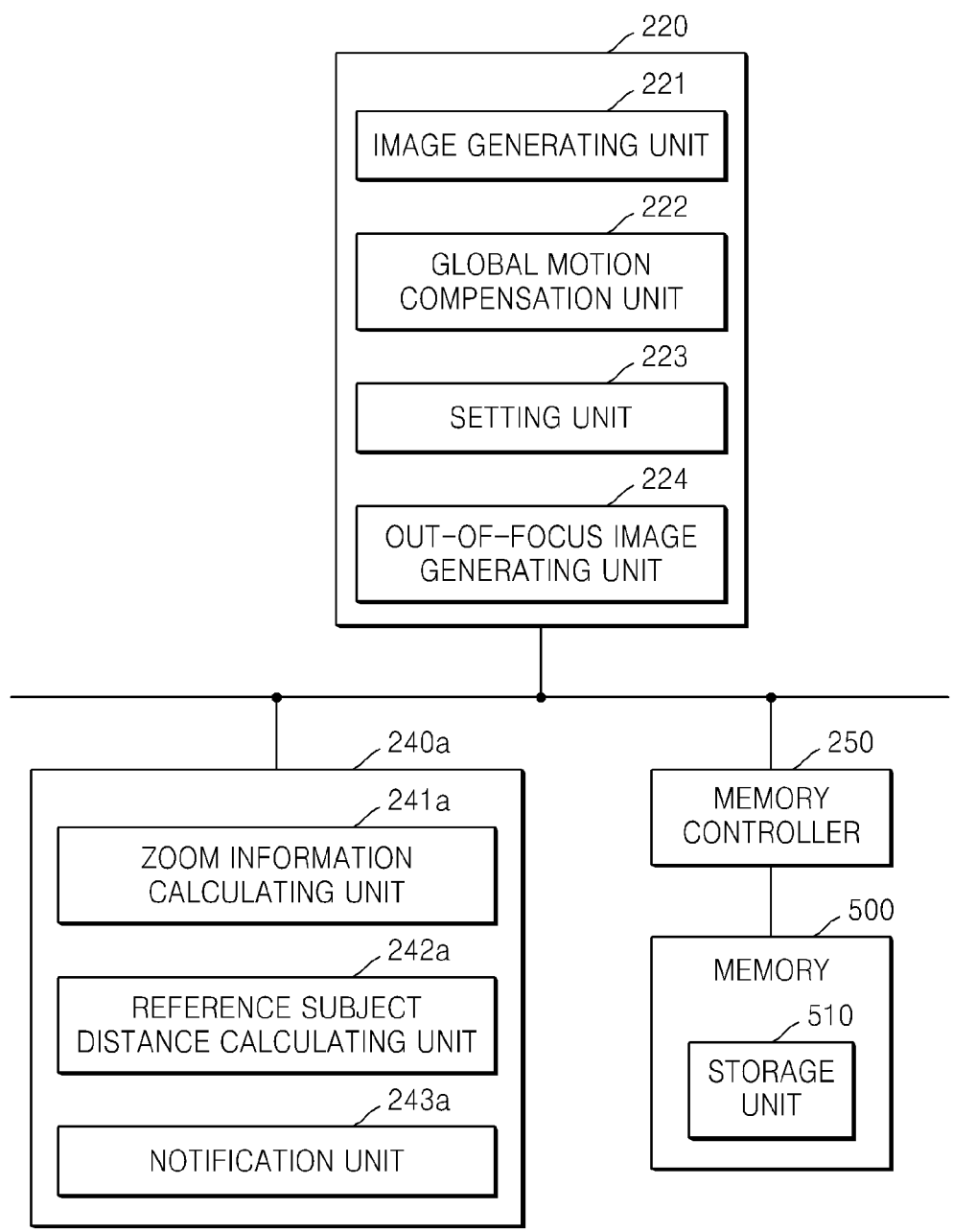
FIG. 2 is a block diagram illustrating a signal processing unit, a CPU, a memory, and a memory controller of the digital image signal processing apparatus of FIG. 1 according to an embodiment of the invention.

FIG. 2 is a block diagram illustrating the signal processing unit 220, a CPU 240a, the memory 500, and the memory controller 250 of the digital image signal processing apparatus of FIG. 1 according to an embodiment of the invention.

Referring to FIG. 2, the memory 500 includes a storage unit 510 in which information regarding a reference subject distance used to perform out-of-focus image processing according to reference zoom information is stored. The reference subject distance used to perform out-of-focus image processing according to the reference zoom information, i.e. a valid subject distance of an out-of-focus effect, increase closer to tele from wide since a main subject area is easily determined closer to tele from wide.

Database of the information regarding the reference subject distance used to perform out-of-focus image processing according to the reference zoom information may be formed by generating an out-of-focus image using AF bracketing with respect to zoom steps, and calculating a subject distance when the out-of-focus effect exceeds a predetermined reference level with respect to the generated out-of-focus image.

Figure 5:
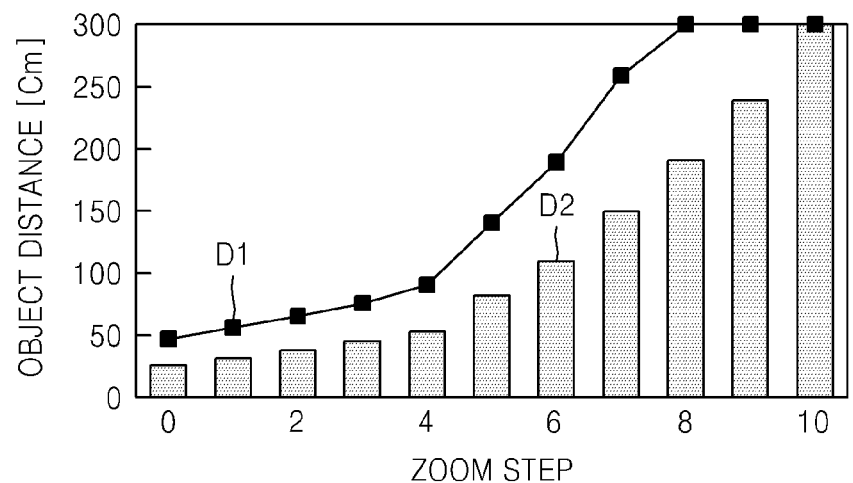
FIG. 5 is a graph for explaining a database of information regarding a reference subject distance used to perform out-of-focus image processing according to reference zoom information.

This will be described in more detail with reference to FIG. 5 that is a graph showing a test result obtained by using cameras D1 and D2. Referring to FIG. 5, a valid distance of an out-of-focus effect is measured at each of zoom steps. In this regard, the out-of-focus effect is determined in a statistical manner through an area of a contrast map regarding out-offocus images that are formed by using AF bracketing with respect to subject distances at corresponding zoom steps. More specifically, the out-of-focus effect is determined that a corresponding subject distance is determined as a valid distance of the out-of-focus effect if 90% or higher of the out-of-focus effect exhibits. Such a determination of the out-of-focus effect in the statistical manner through the contrast map is that since different results depend according to an edge and a pattern of a main subject, the database shown in the graph may be prepared in consideration of a quantitative analysis and an aptitude evaluation as well.

The database may be stored in the storage unit 510 of the memory 500. The memory controller 250 may input and output data stored in the storage unit 510.

Referring back to FIG. 2, the CPU 240*a* may include a zoom information calculating unit 241*a*, a reference subject distance calculating unit 242*a*, and a notification unit 243*a*.

More specifically, the zoom information calculating unit 241*a* calculates zoom information prepared by a user. For example, the zoom information calculating unit 241*a* may calculate the number of zoom steps. An interchangeable lens digital camera may receive zoom information from an interchangeable lens controller by communicating with an interchangeable lens.

The reference subject distance calculating unit 242*a* calculates reference subject distance information corresponding to the zoom information calculated from the database. Referring to FIG. 5, for example, when the zoom step of the digital camera D1 is 1, the reference subject distance calculating unit 242*a* may calculate 50 cm as the reference subject distance information.

Figure 6:
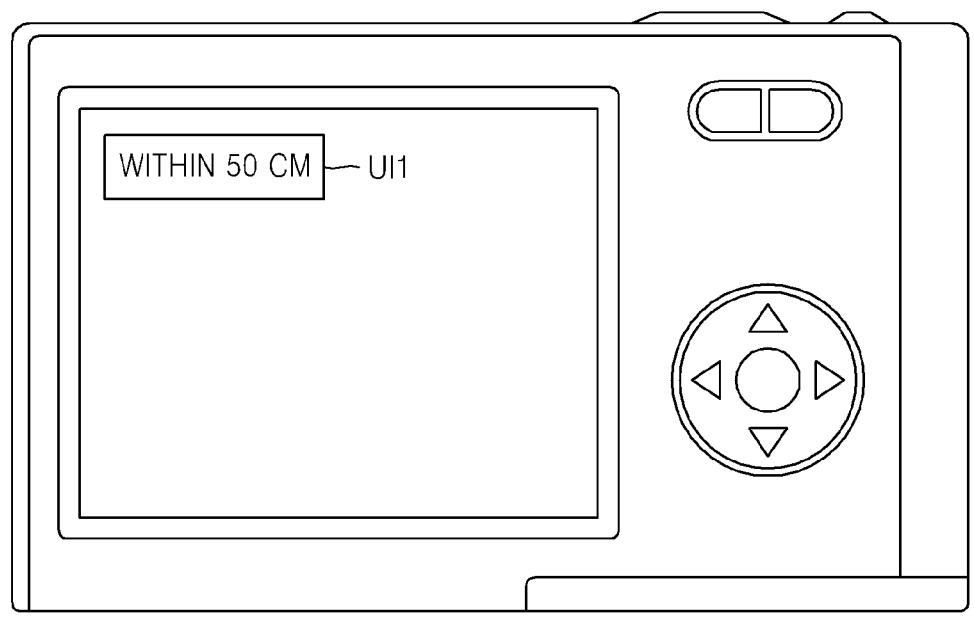
FIGS. 6 through 8 show examples of notification information.

The notification unit 243*a* may control the user to be notified of first notification information corresponding to the reference subject distance information. For example, referring to FIG. 6, element UI1, "WITHIN 50 CM", that is the reference subject distance information corresponding to current zoom information may be displayed as an image. Therefore, the user may adjust a distance from a current subject to correspond to a display distance and perform photographing by checking a message, which guides the user to obtain a desired out-of-focus image and to recognize whether an out-of-focus image is formed as well. Furthermore, the value of 50 cm corresponding to the reference subject distance information may be output as an audio signal. A UI image or the audio signal corresponding to the reference subject distance information may be previously stored in the memory 500. The notification unit 243*a* may select the UI image or the audio signal corresponding to the reference subject distance information. The selected UI image may be displayed on a display unit, and the audio signal may be output through a speaker.

If current subject distance information corresponds to the reference subject distance information, the signal processing unit 220 of the current embodiment may include an image generating unit 221 that generates a first image in which the subject is focused, a second image in which a background is focused, and a third image which is not focused, a setting unit 223 that sets a subject area and a background area of the first image and the second image, and an out-of-focus image generating unit 224 that generates an out-of-focus image by combining the subject area and the first image and the background image and the third image.

More specifically, the image generating unit 221 may receive a single photographing resume signal, for example, a S1 signal by half-pressing a shutter release button, and generate a plurality of images having different focuses on the same subject and background. The first image in which subject is focused, the second image in which the background is focused, and the third image which is not focused and is captured at a super macro may be generated. Although images of a frame are generated by inputting the images into an image device and performing predetermined image processing on the images in the current embodiment, the invention is not limited thereto. Any one of images input into the image device and images on which at least one of image signal processing is performed may be generated.

The setting unit 223 obtains a binary image in which a subject part and a background part are set by using the first image and the second image.

The out-of-focus image generating unit 224 may generate the out-of-focus image by combining the subject part of the binary image and the subject area of the first image and combining a background area of the binary image and a background part of the third image captured at the super macro.

The signal processing unit 220 may further include a global motion compensation unit 222 that compensates for global motions of the second image and the third image with respect to the first image.

The global motion means shifting of all pixels due to a change in a location of a digital camera when the first image, the second image, and the third image are sequentially captured. Compensation of the global motion is for aligning pixels of the first image, the second image, and the third image to correspond to each other by compensating for the shifting of all pixels.

Figure 3:
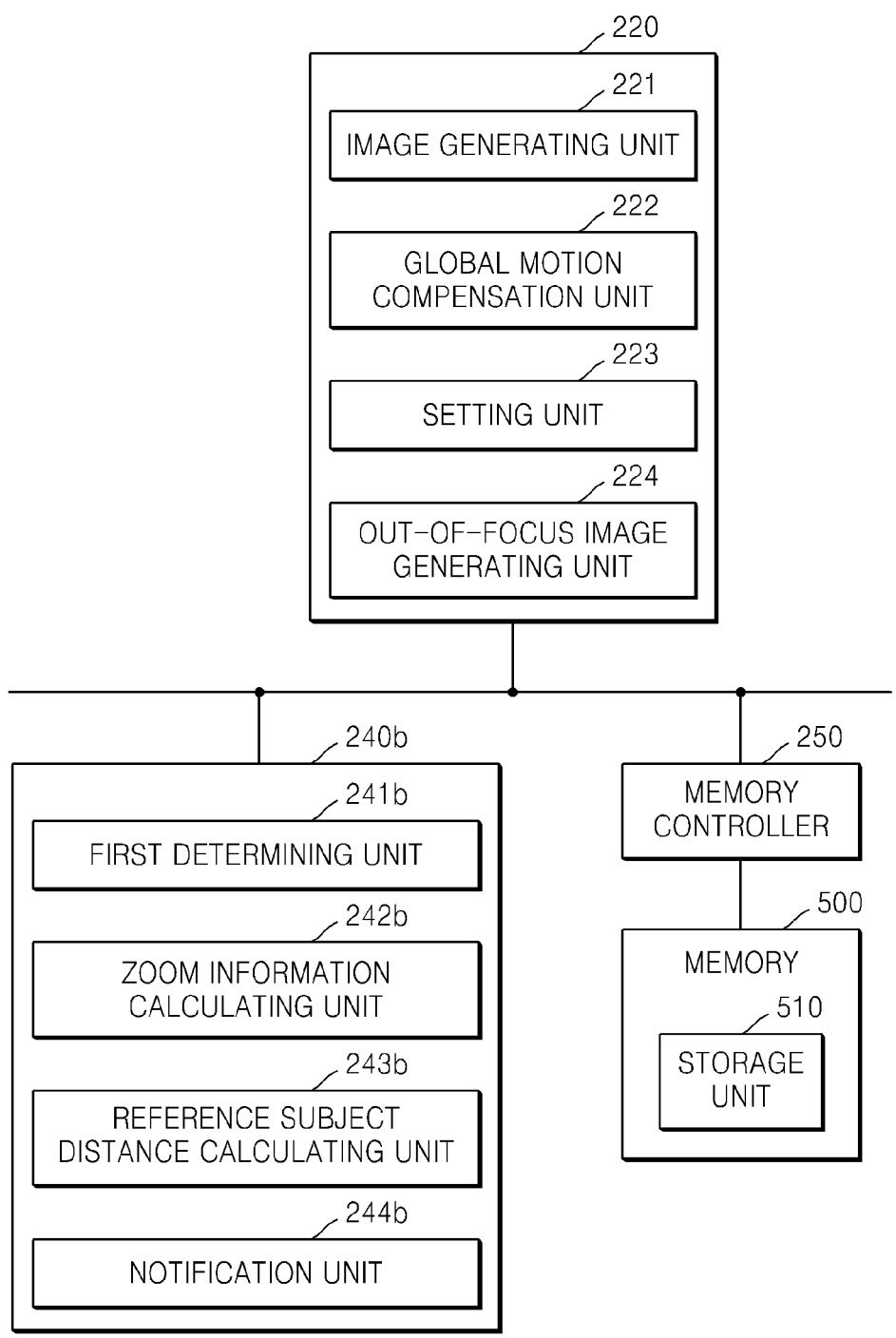
FIG. 3 is a block diagram illustrating a signal processing unit, a CPU, a memory, and a memory controller of the digital image signal processing apparatus of FIG. 1 according to another embodiment of the invention.

FIG. 3 is a block diagram illustrating the signal processing unit 220, a CPU 240*b*, the memory 500, and the memory controller 250 of the digital image signal processing apparatus of FIG. 1 according to another embodiment of the invention. The signal processing unit 220 and the memory 500 of the current embodiment are the same as those of the previous embodiment described with reference to FIG. 2, and thus descriptions thereof will not be repeated. The CPU 240*b* of the current embodiment will be described below.

The CPU 240*b* includes a first determining unit 241*b* that determines whether an out-of-focus image can be generated. More specifically, the first determining unit 241*b* may determine whether the out-of-focus image can be generated from the first image, the second image, and the third image, or may determine whether the out-of-focus image can be generated by determining whether the out-of-focus image that is a resultant of combined images has a predetermined reliability. More specifically, when a contrast map is generated by using the first image in which a subject is focused and the second image in which a background is focused, if a contrast difference between the first image and the second image is smaller than a predetermined reference, the first determining unit 241*b* may determine that the out-of-focus image cannot be generated.

When the first determining unit 241*b* determines that the out-of-focus image cannot be generated, the zoom information calculating unit 242*b* may calculate current zoom information, the reference subject distance information calculating unit 243*b* may calculate reference subject distance information corresponding to the current zoom information, and the notification unit 244*b* may output second notification information corresponding to the reference subject distance information. More specifically, the second notification information corresponding to the reference subject distance information may include information regarding whether the out-of-focus image can be generated, guide information used to generate the out-of-focus image, and a value of the reference subject distance information as well. The information regarding whether the out-of-focus image can be generated and the guide information used to generate the out-of-focus image include a result regarding whether the out-of-focus image is generated or not by using a subject distance as a variable, and the guide information is used to guide adjustment of the subject distance, and thus the above information may correspond to the reference subject distance information. More specifically, as described above, the second notification information may be a value of the reference subject distance information, a success percentage of a generation of the out-of-focus image, or the guide information used to generate the out-of-focus image. For example, as the guide information used to generate the out-of-focus image, a message such as "far", "come closer", "impossible to currently generate an out-of-focus image", "possible to currently generate an out-of-focus image", etc. may be displayed as an image or output as an audio signal.

Figure 4:
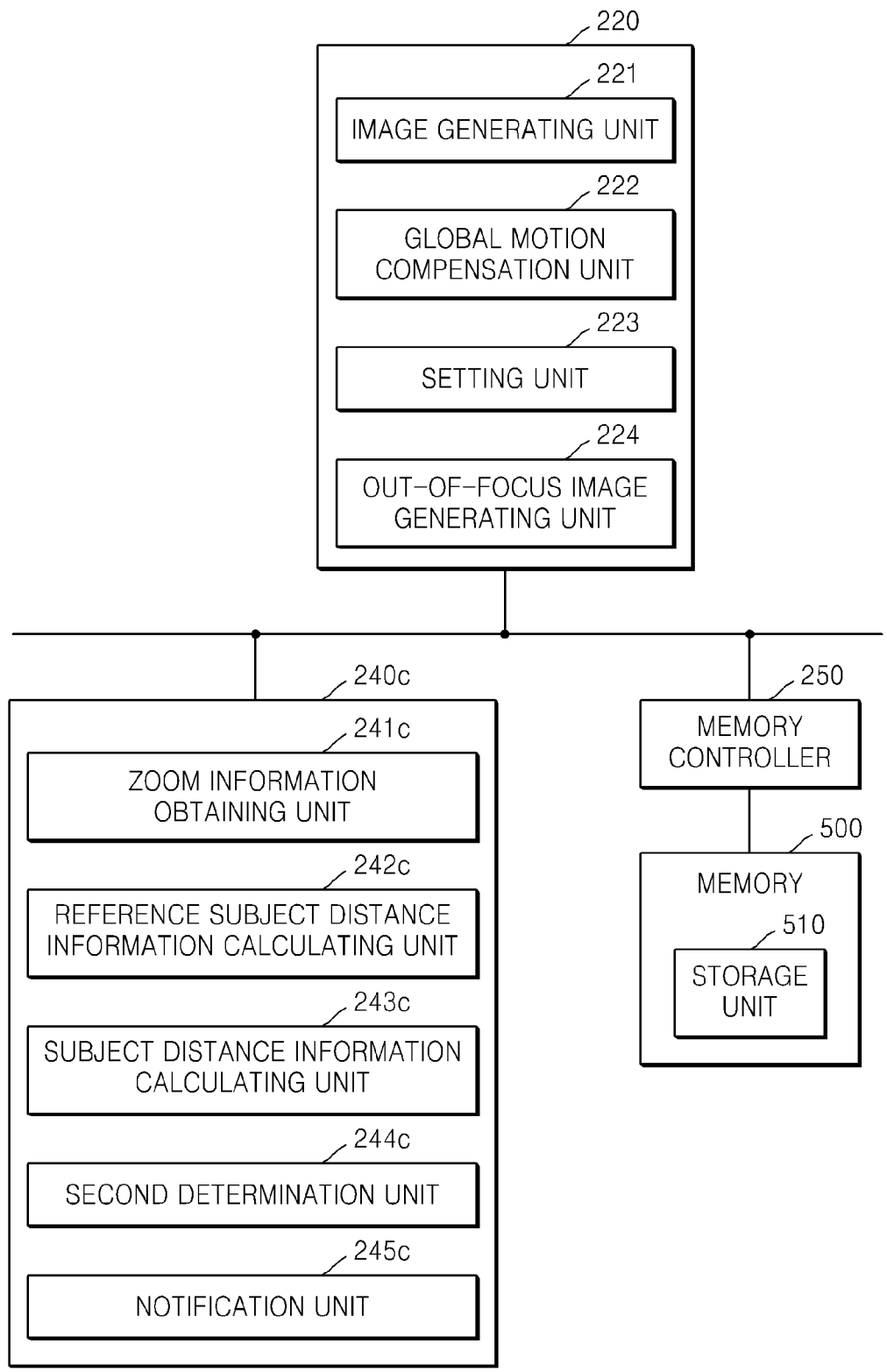
FIG. 4 is a block diagram illustrating a signal processing unit, a CPU, a memory, and a memory controller of the digital image signal processing apparatus of FIG. 1 according to another embodiment of the invention.

FIG. 4 is a block diagram illustrating signal processing unit 220, a CPU 240c, the memory 500, and the memory controller 250 of the digital image signal processing apparatus of FIG. 1 according to another embodiment of the invention. The signal processing unit 220 and the memory 500 of the current embodiment are the same as those of the previous embodiment described with reference to FIG. 2, and thus descriptions thereof will not be repeated. The CPU 240c of the current embodiment will be described below.

The CPU 240c includes a zoom information obtaining unit 241c that obtains current zoom information, a reference subject distance information calculating unit 242c that calculates reference subject distance information corresponding to the current zoom information, and a notification unit 245c that outputs notification information corresponding to the reference subject distance information.

The CPU 240c of the current embodiment includes a subject distance information calculating unit 243c that calculates current subject distance information and a second determination unit 244c that compares the current subject distance information with the reference subject distance information.

Figure 7:
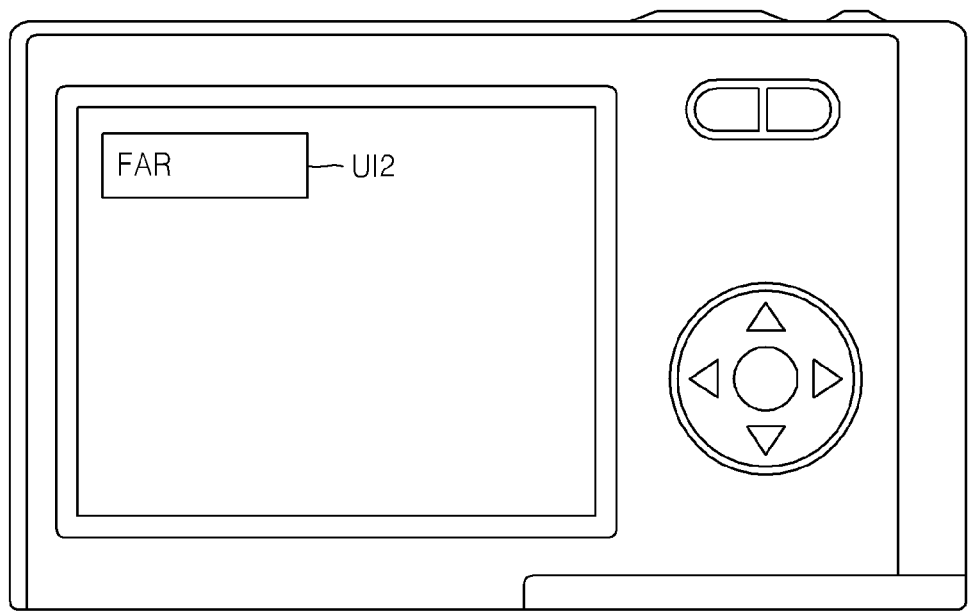
Figure 8:
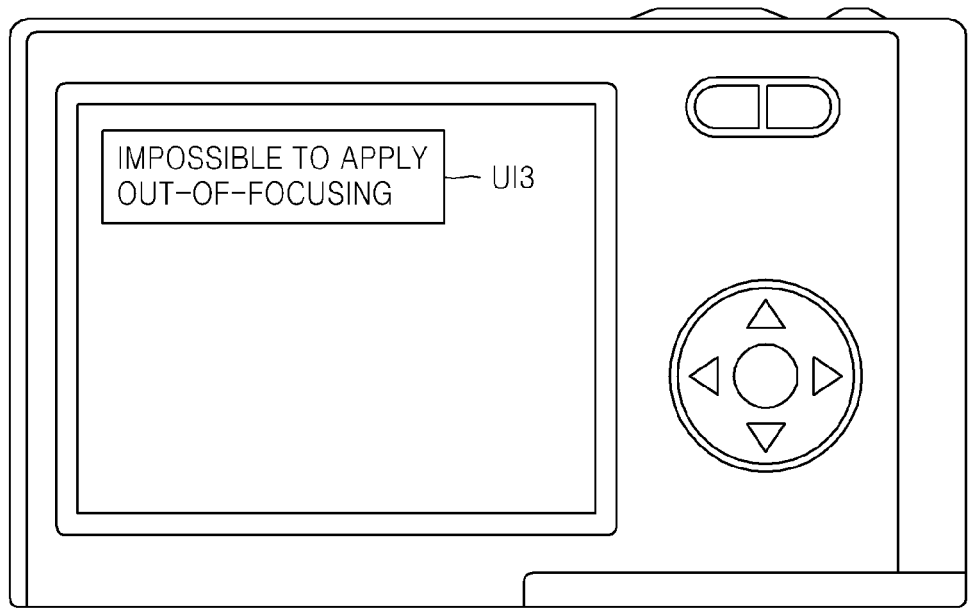

If the second determination unit 244c determines that the subject distance information does not correspond to the reference subject distance information, the notification unit 245c may output third notification information corresponding to the reference subject distance information. The third notification information may include information regarding whether an out-of-focus image can be generated, guide information used to generate the out-of-focus image, and a value of the reference subject distance information as well. For example, if a current subject distance is far from a reference subject distance, a message such as "too far", "come closer", etc. may be displayed as an image or output as an audio signal. An image "FAR" U12 shown in FIG. 7 may be displayed. A message image "IMPOSSIBLE TO APPLY OUT-OF-FOCUSING" U13 in FIG. 8 may be displayed.

Therefore, since an out-of-focus image cannot be generated according to a subject distance according to the above embodiments, the user can be notified of information regarding a reference subject distance used to generate the out-of-focus image at a appropriate time desired by the user.

Generation of an out-of-focus image will now be described in more detail below.

Figure 9:
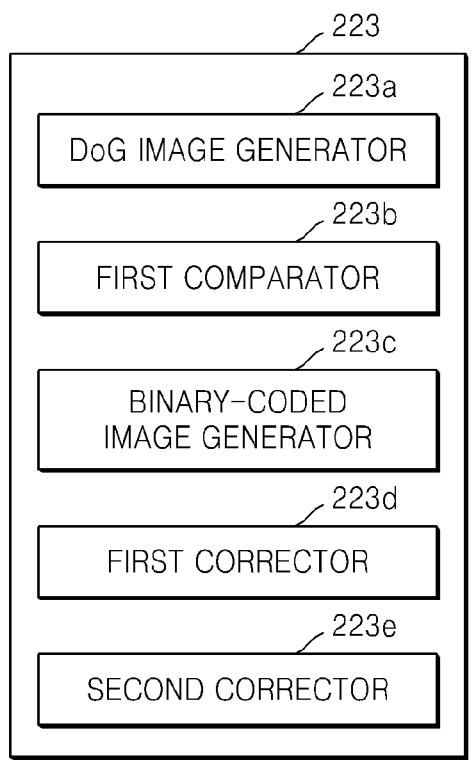
FIG. 9 is a block diagram illustrating a setting unit of a signal processing unit of FIG. 2.

FIG. 9 is a block diagram illustrating the setting unit 223 of the signal processing unit 220 of FIG. 2. Referring to FIG. 9, the setting unit 223 includes a difference of Gaussian (DoG) image generator 223a, a first comparator 223b, a binary-coded image generator 223c, a first corrector 223d, and a second corrector 223e.

The DoG image generator 223a applies a DoG filter to each of the first and second images and to generate a first DoG image and a second DoG image. The DoG filter is a filter showing a difference between two Gaussian filters having different sigma (σ) values. This may be represented by the following Equations 1 through 3. Equation 1 denotes a first Gaussian filter having a first sigma value (σ1), and Equation 2 denotes a second Gaussian filter having a second sigma value (σ2). Here, the second sigma value σ2 is greater than the first sigma value σ1. When the first sigma value σ1 is greater than the second sigma value σ2, high frequency components may not be obtained in the DoG image. The DoG filter represents a difference between the first Gaussian filter and the second Gaussian filter as shown in Equation 3. Here, in Equations 1 through 3, x and y denote a coordinate of a pixel, and the first sigma value σ1 and the second sigma value σ2 is a standard deviation representing a degree of smoothing of the Gaussian filter.

$$G_1 = \frac{1}{2\pi\sigma_1^2} e^{\frac{-(x^2+y^2)}{2\pi\sigma_1^2}}$$ [Equation 1]

$$G_2 = \frac{1}{2\pi\sigma_2^2} e^{\frac{-(x^2+y^2)}{2\pi\sigma_2^2}}$$ [Equation 2]

$$DoG(x, y) =$$ [Equation 3]

$$G_1(x, y) - G_2(x, y) = \left[\frac{1}{2\pi\sigma_1^2} e^{\frac{-(x^2+y^2)}{2\pi\sigma_1^2}}\right] - \left[\frac{1}{2\pi\sigma_2^2} e^{\frac{-(x^2+y^2)}{2\pi\sigma_2^2}}\right]$$

The first DoG image and the second DoG image generated by the DoG image generator 223a respectively represent high frequency components of the first and second images. Therefore, clarifies of the first image and the second image may be compared by comparing magnitudes of the high frequency components in the first and second DoG images.

The first comparator 223b compares magnitudes of the high frequency components in mask regions, which include reference pixels that are located at corresponding locations in the first DoG image and the second DoG image. Here, the reference pixel may be a pixel designated by the user, or a pixel that is located at a center portion of the mask region. The mask region may refer to all pixels included in the mask when the mask is applied to first and second DoG images.

The binary-coded image generator 223c generates a single binary-coded image by representing the reference pixel as a first brightness value when the high frequency component of the first DoG image is greater than that of the second DoG image and representing the reference pixel as a second brightness value when the high frequency component of the second DoG image is greater than that of the first DoG image.

The first corrector 223d corrects an error pixel included in the generated binary-coded image, and the second corrector 223e corrects a boundary between the subject and the background included in the binary-coded image, in which the error pixel is corrected by the first corrector. In the binary-coded image, the subject portion is represented as the first brightness value, and the background portion may be represented as the second brightness value.

Figure 10:
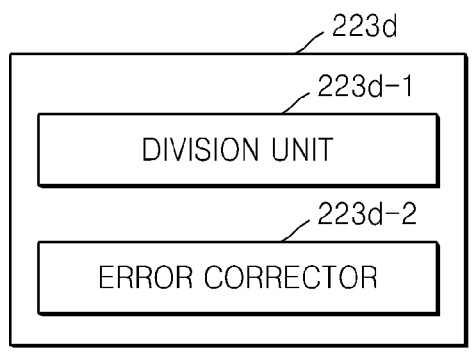
FIG. 10 is a detailed block diagram of a first correction unit of a setting unit of FIG. 9.

FIG. 10 is a detailed block diagram of the first correction unit 223d of the setting unit 223 of FIG. 9. Referring to FIG. 10, a division unit 223d-1 divides the binary-coded image into a plurality of blocks. In addition, an error corrector 223d-2 converts brightness values of the pixels having the second brightness value into the first brightness value when there are a lot of pixels having the first brightness value in blocks divided by the division unit 223d-1, and converts the brightness values of the pixels having the first brightness value into the second brightness value when there are a lot of pixels having the second brightness value in the blocks. That is, the error corrector 223d-2 corrects the error pixel with the result that the brightness value of an isolated pixel is converted into the brightness value of neighboring pixels.

Figure 11:
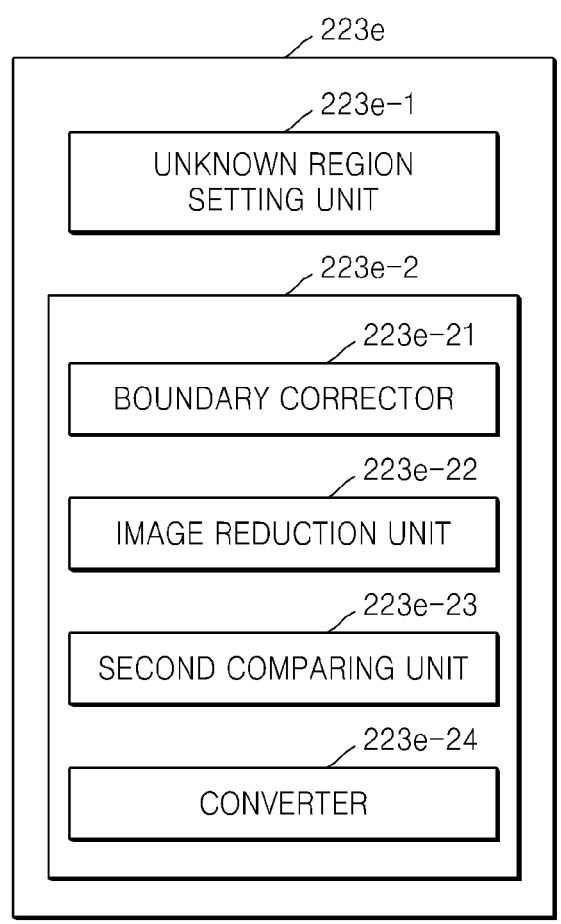
FIG. 11 is a detailed block diagram of a second correction unit of the setting unit of FIG. 9.

FIG. 11 is a detailed block diagram of the first correction unit 223e of the setting unit 223 of FIG. 9. Referring to FIG. 11, an unknown region setting unit 223e-1 sets a boundary and peripheral region between the subject portion and the background portion in a binary-coded image as an unknown region. Here, the boundary denotes an interface between the subject and the background, and the peripheral region denotes some extension of the unknown region from the boundary towards the subject and the background. A boundary corrector 223e-21 gradually reduces the set unknown region by comparing the unknown region with a first image. In detail, the boundary corrector 223e-21 includes an image reduction unit 223e-22 that reduces the binary-coded image and the first image by the same ratio, a second comparing unit 223e-23 that determines whether the pixel included in the unknown region in the binary-coded image corresponds to the subject portion or the background portion, via the brightness value or color information of the pixel located at the same location in the first image, and a converter 223e-24 that converts the brightness of the pixel into the first brightness value when the pixel included in the unknown region corresponds to the subject portion and converts the brightness of the pixel into the second brightness value when the pixel included in the unknown region corresponds to the background portion.

The out-of-focus image generation unit 224 included in the DSP 220 of FIG. 2 substitutes the subject portion with the first brightness value, of the binary-coded image with the corresponding pixels in the first image, and substitutes the background portion, with the second brightness value, of the binary coded image with the corresponding pixels in a third image. That is, the out-of-focus image generation unit 224 combines the subject portion of the binary-coded image with the subject portion of the first image, and alpha-blends the background portion of the binary-coded image with the background portion of the third image to combine images. Therefore, the binary-coded image is combined with the other images so that the boundary between the subject and the background in the binary-coded image may be naturally represented.

Figure 12:
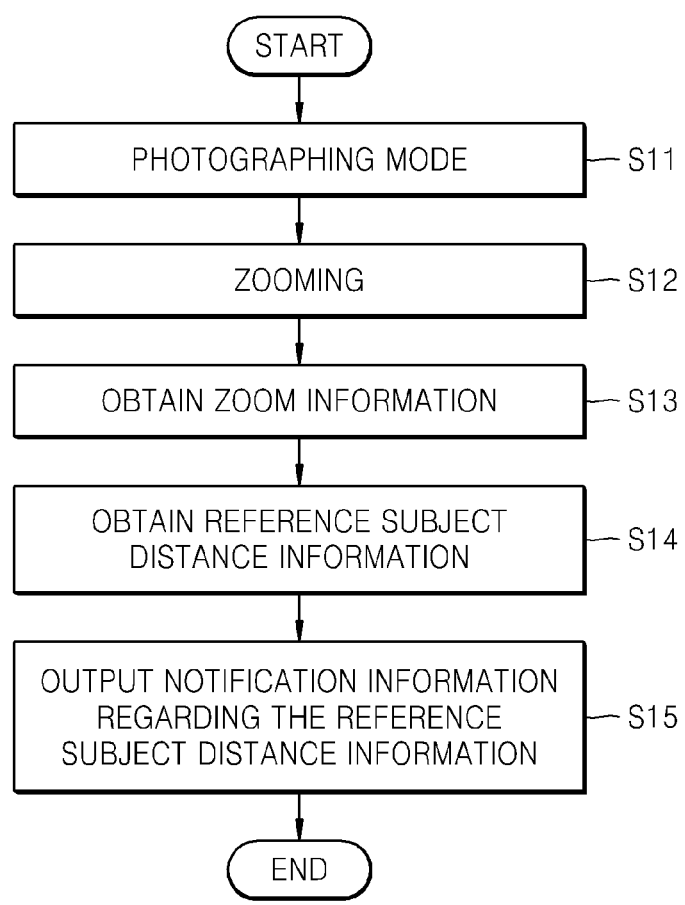
FIG. 12 is a flowchart illustrating a digital image processing method according to an embodiment of the invention.

FIG. 12 is a flowchart illustrating a digital image processing method according to an embodiment of the invention.

Referring to FIG. 12, a user enters a photographing mode and stands by photographing in operation S11. The user adjusts a zoom ring and performs a zooming operation in operation S12. Zoom information determined by performing the zooming operation is obtained in operation S13. Reference subject distance information corresponding to the zoom information is obtained in operation S14. Notification information regarding the reference subject distance information is output in operation S15.

Figure 13:
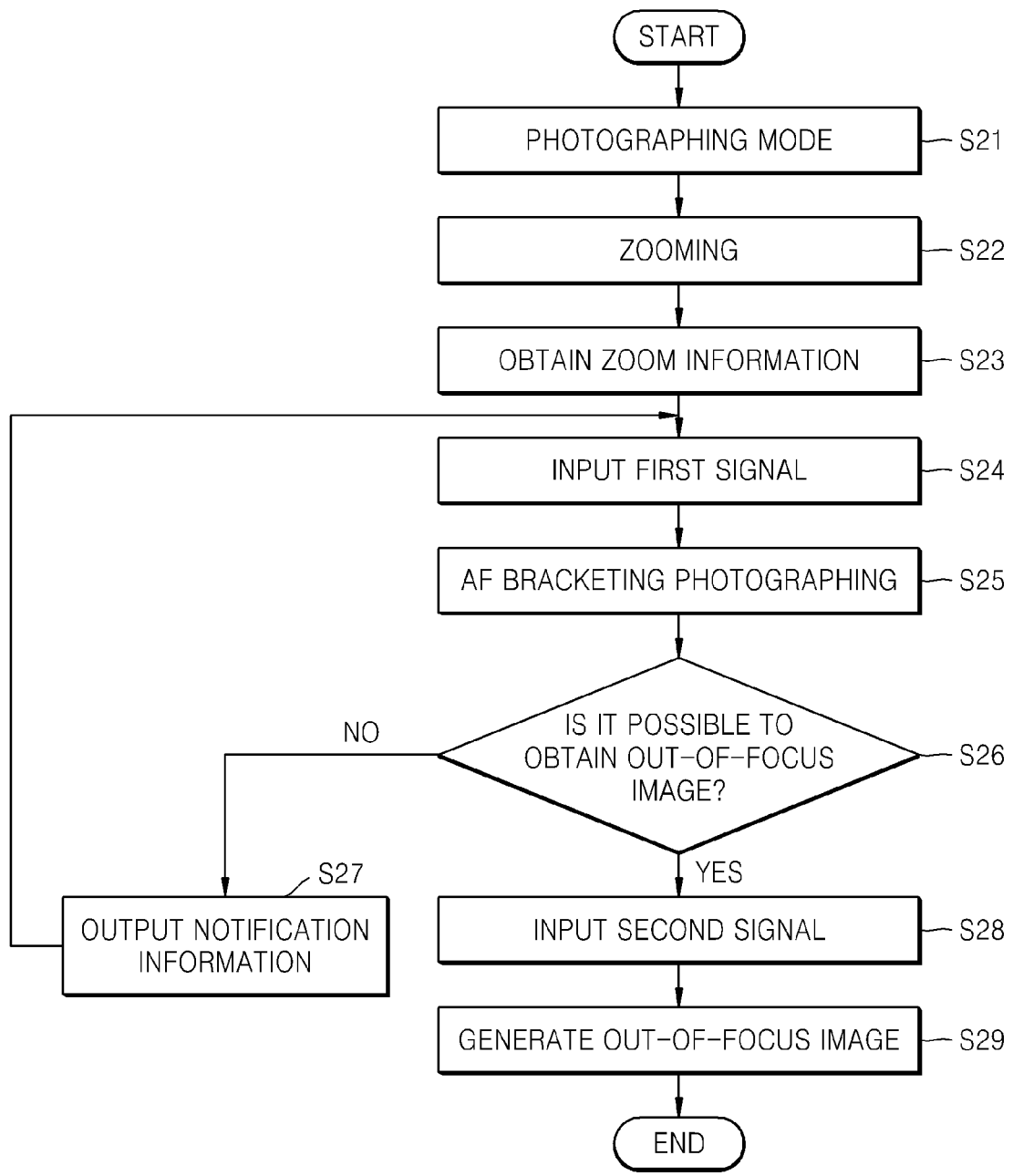
FIG. 13 is a flowchart illustrating a digital image processing method according to another embodiment of the invention.

FIG. 13 is a flowchart illustrating a digital image processing method according to another embodiment of the invention. Referring to FIG. 13, a photographing mode is entered in operation S21. A zooming operation is performed by adjusting a zoom ring in operation S22. Current zoom information is obtained in operation S23. A first signal is input in operation S24. The first signal may lead to a S1 status by half-pressing a shutter release button. Therefore, AE and AW operations may be performed together with subsequent operations as well. The current zoom information may be obtained after inputting the first signal. AF bracketing photographing is performed by inputting the first signal in operation S25. A first image in which a subject is focused, a second image in which a background is focused, and a third image that is not focused are generated by performing the AF bracketing photographing. Whether to obtain an out-of-focus image is determined by using the first, second, and third images in operation S26. Such a determination may be performed in various ways. In an embodiment, if a contrast difference between the first image and the second image is below (less than) a predetermined reference level, more specifically, if an area below (less than) the predetermined reference level of the contrast difference exceeds (is greater than) a predetermined reference area, it is determined that the out-of-focus image may not be obtained. In another embodiment, it is determined that the out-of-focus image may not be obtained even after the first through third images according to the method of generating the out-of-focus image are generated as stated above. In addition, it is determined that the out-of-focus image may not be obtained if the out-of-focus image is not generated by using any one of the first through third images. Various determination methods may be applied. If it is determined that the out-of-focus image may not be obtained, notification information used to generate the out-of-focus image, i.e. notification information regarding the reference subject distance information corresponding to the current zoom information, is output in operation S27. The notification information may be a value regarding the reference subject distance information, or may be distance information such as information indicating a current subject distance is too far. The current subject distance may be estimated from the number of steps of an AF motor while generating the first image. If the current subject distance is longer than a reference subject distance, the notification information regarding the current subject distance that is longer than the reference subject distance may be output. A user may confirm the notification information and readjust zooming in operation S22. Alternatively, although not shown, a digital photographing apparatus may be relocated.

In operation S26, if the out-of-focus image is obtained, a second signal is input in operation S28. The second signal is used to generate the out-of-focus image by fully-pressing the shutter release button and combining the first through third images in operation S29. If necessary, if it is determined that the out-of-focus image may be obtained, notification information including a message "possible to capture an out-of-focus image" may be output. The user may confirm the notification information so as to guide generation of a desired out-of-focus image by inputting the second signal.

Figure 14:
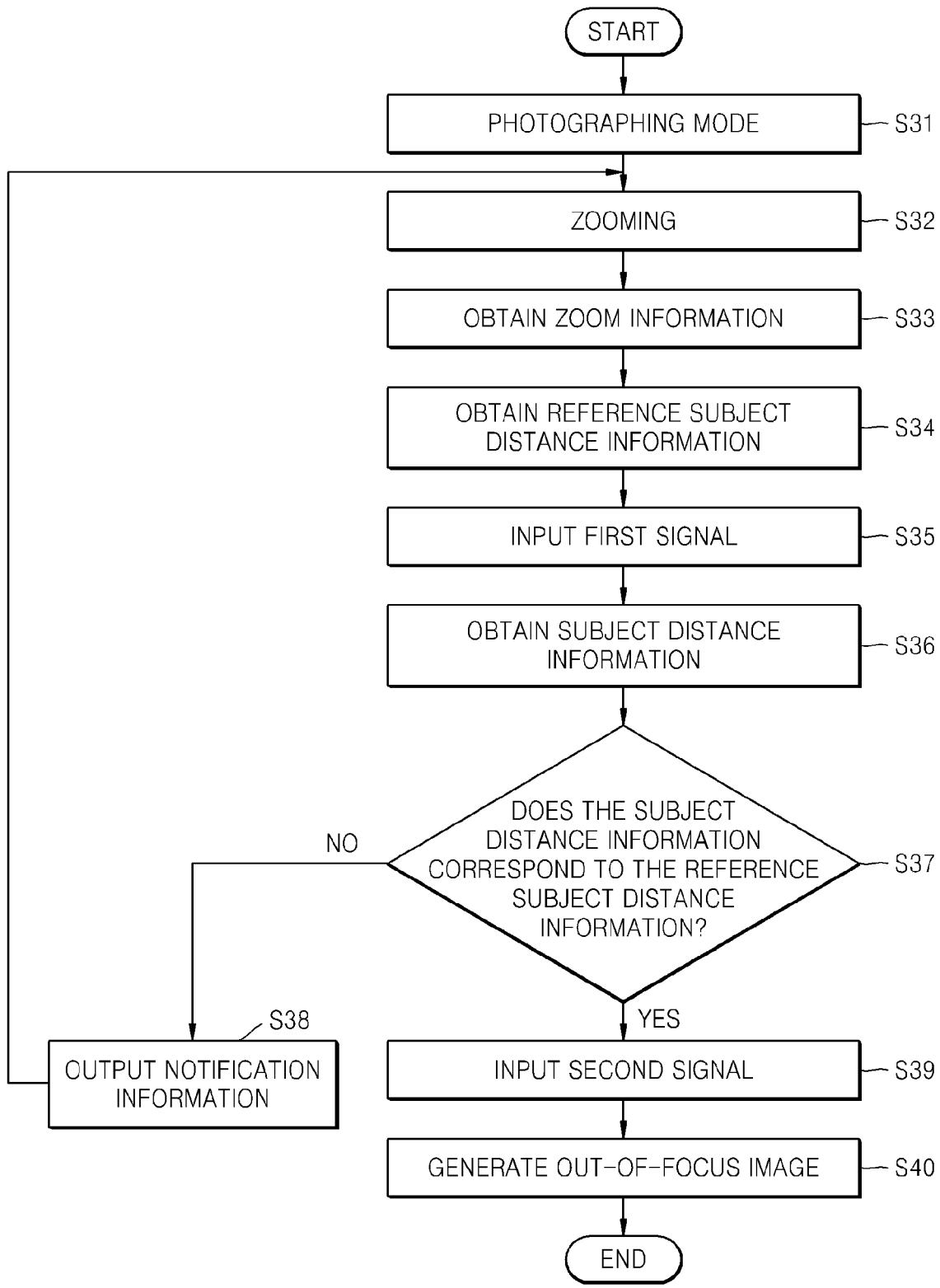
FIG. 14 is a flowchart illustrating a digital image processing method according to another embodiment of the invention.

FIG. 14 is a flowchart illustrating a digital image processing method according to another embodiment of the invention. Referring to FIG. 14, a photographing mode is entered in operation S31. A zooming operation is performed by adjusting a zoom ring in operation S32. The current zoom information is obtained in operation S33. Reference subject distance information corresponding to the zoom information is obtained in operation S34. A first signal is input in operation S35. For example, the first signal may lead to a S1 status by half-pressing a shutter release button. Therefore, AE and AW operations may be performed together with subsequent operations as well. The current zoom information and the reference subject distance information may be obtained after inputting the first signal. Current subject distance information may be obtained in response to the first signal in operation S36. If the first signal is input, AF bracketing photographing is performed, and the first through third images described above are generated. Therefore, the current subject distance may be estimated from the number of steps of an AF motor of the first image in which a subject is focused. Further, the current zoom information and/or the reference subject distance information may be obtained after the first signal is input.

It is determined whether the current subject distance information corresponds to the reference subject distance information in operation S37. If it is determined that the current subject distance information does not correspond to the reference subject distance information, notification information is output in operation S38. The notification information may be output as a value indicating the reference subject distance information, or may be output as an image or an audio signal indicating information such as "a current subject is far", or a message "come closer to a subject", etc. The user may readjust a zooming operation of a digital photographing apparatus according to the notification information in operation S32. A subsequent operation may be repeatedly performed. Alternatively, although not shown, the user may confirm the notification information, relocate the digital photographing apparatus, and adjust a distance between the digital photographing apparatus and the subject. The user may input the first signal again, obtain the adjusted distance, and repeatedly perform a subsequent operation.

If the subject distance information corresponds to the reference subject distance information, the user may perform photographing by fully-pressing a shutter release button. That is, the user may input the second signal in operation S39, and generate an out-of-focus image by combining the first through third images in operation S40. If necessary, if the subject distance information corresponds to the reference subject distance information, notification information including a message such as "possible to capture an out-of-focus image" may be output. The user may confirm the notification information so as to guide generation of a desired out-of-focus image by inputting the second signal.

An operation of generating an out-of-focus image will now be described in more detail with reference to the following drawings.

Figure 15A:
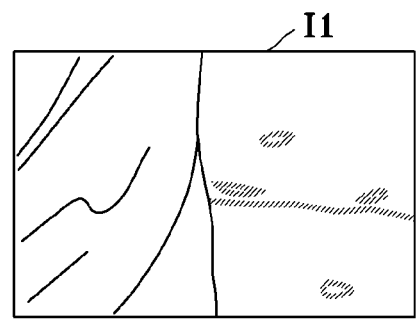
FIGS. 15A through 15C show a plurality of images having different focuses from each other, according to an embodiment of the invention.
Figure 15B:
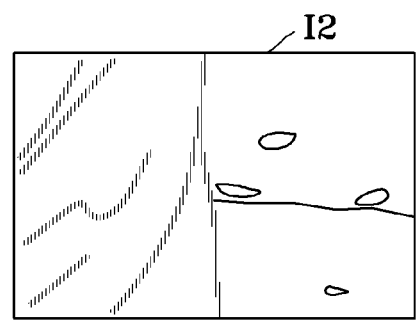
Figure 15C:
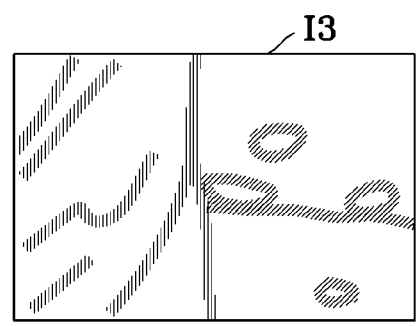

FIGS. 15A through 15C show a plurality of images having different focuses from each other, according to an embodiment of the invention.

FIG. 15A shows a first image I1 in which a subject is focused. FIG. 15B shows a second image I2 in which a background is focused. FIG. 15C shows a third image I3, that is, a super-macro image, which is not focused. Solid lines indicate parts which are focused, and dotted lines indicate parts which are not focused. The first through third images are obtained by capturing the same subject and background and may be sequentially obtained by inputting a first signal used to perform an AF operation, i.e. by half-pressing a shutter release button. An out-of-focus image is an image in which the subject is only focused and the background is blurred, and thus, other images should be obtained based on the image, in which the subject is focused. In addition, since hand shake generally occurs less immediately after pushing the shutter-release button, the first image I1 should be captured initially in order to obtain the image with less hand shake.

Figure 16A:
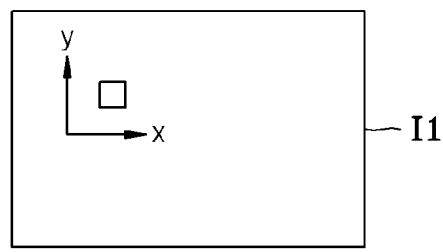
FIGS. 16A through 16D are diagrams showing global motion compensation processes according to an embodiment of the invention.
Figure 16B:
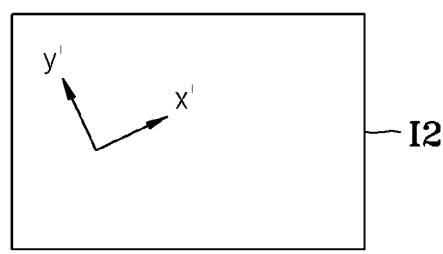
Figure 16C:
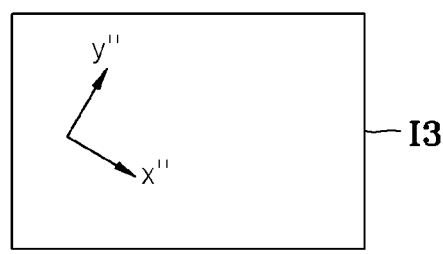
Figure 16D:
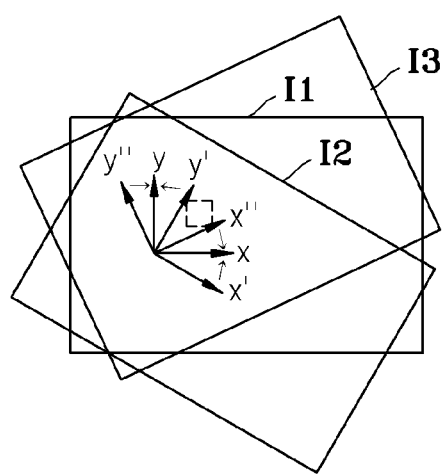

The global motion of each of the second and third images I2 and I3 are compensated for based on the first image I1. More specifically, FIGS. 16A through 16C are slightly twisted with respect to reference axes of the first image I1, the second image I2, and the third image I3. Thus, as shown in FIG. 16D, shifting of all of the pixels of the second and third images I2 and I3 is compensated for based on the first image I1 and the first through third images I1, I2, and I3 are aligned so that the pixels in the first through third images I1, I2, and I3 correspond to each other. Through the above process, the shifting of all of the pixels generated due to the hand shake occurring while the plurality of images are captured may be compensated for. In addition, since the global motion is compensated for, the pixels included in the plurality of images may correspond to each other, and thus, one binary-coded image or an out-of-focus image may be generated by using the plurality of images.

Figure 17A:
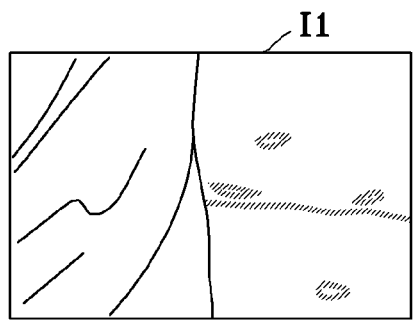
FIGS. 17A and 17B show processes of applying a difference of Gaussian (DoG) filter to images and obtaining results, according to an embodiment of the invention.
Figure 17B:
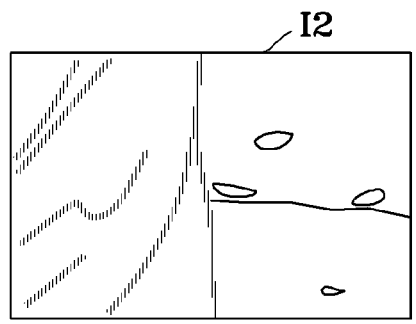

Referring to FIG. 17A, a first DoG image DI1 is generated by applying a DoG filter to the first image I1, and a second DoG image DI2 is generated by applying the DoG filter to the second image I2.

The first and second DoG images DI1 and DI2 may be obtained by extracting high frequency components of the first and second images I1 and I2 by using the DoG filter. Since the DoG filter is described in detail with reference to FIG. 9, descriptions of examples and applications of the DoG filter will not be provided here.

Figure 18A:
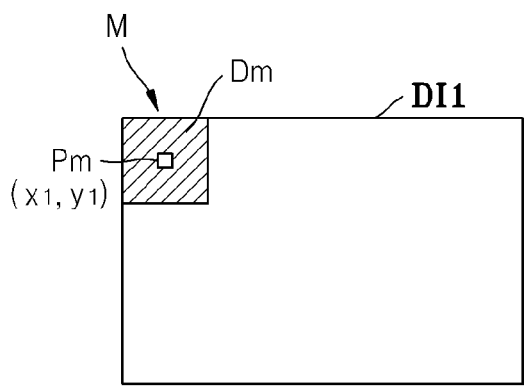
FIGS. 18A and 18B illustrate processes of comparing high frequency components in a first DoG image and a second DoG image according to an embodiment of the invention.
Figure 18B:
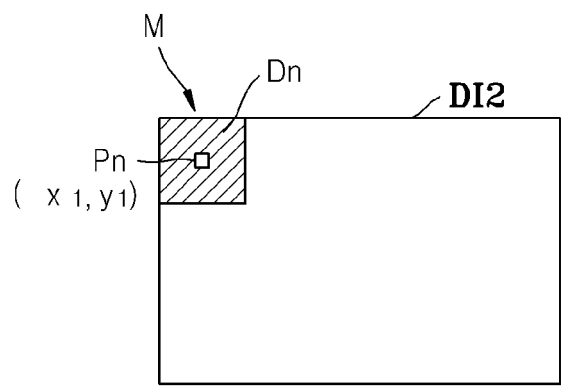

FIGS. 18A and 18B illustrate processes of comparing high frequency components in the first DoG image DI1 and the second DoG image DI2 according to an embodiment of the invention. Referring to FIG. 18A, an 11×11 mask M is applied to the first DoG image DI1. A pixel located at a center portion of the mask M becomes a reference pixel Pm. Likewise, Referring to FIG. 18B, an 11×11 mask M is applied to the second DoG image DI2. A pixel located at a center portion of the mask M is a reference pixel Pn. Here, the reference pixel Pm of the first DoG image DI1 and the reference pixel Pn of the second DoG image DI2 are located at corresponding positions, that is, a location (x1, y1) in each of the first and second DoG images DI1 and DI2. The high frequency components of the 11×11 pixels including the reference pixel Pn or Pm in the mask region Dm or Dn of the first DoG image DI1 or the second DoG image DI2 are compared with each other. For example, a pixel $I_{max}$ having the highest brightness and a pixel $I_{min}$ having the lowest brightness are extracted from the above 11×11 pixels. Next, a difference Di between the brightnesses of the pixels $I_{max}$ and $I_{min}$ is calculated by using Equation 4. If the difference Di between the brightness values in the first DoG image DI1 is greater than that of the second DoG image DI2, it is determined that the high frequency component of the first DoG image DI1 is greater than that of the second DoG image DI2. Likewise, if the difference Di between the brightness values in the second DoG image DI2 is greater than that of the first DoG image DI1, it is determined that the high frequency component of the second DoG image DI2 is greater than that of the first DoG image DI1.

$$D_i = I_{maxi} - I_{mini} \qquad \text{[Equation 4]}$$

In the current embodiment of the invention, the 11×11 mask M is used because accuracy of the result of Di is degraded when the mask is smaller than 11×11 and calculation speed is reduced when the mask is greater than 11×11.

Figure 19A:
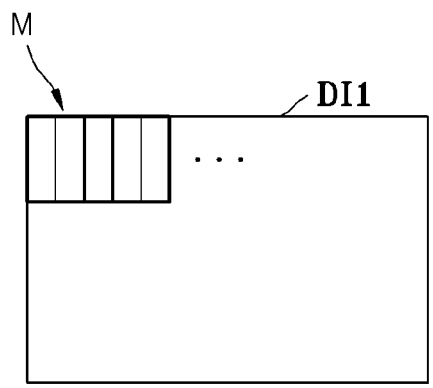
FIGS. 19A through 19C are diagrams illustrating processes of generating a binary-coded image, according to an embodiment of the invention.
Figure 19B:
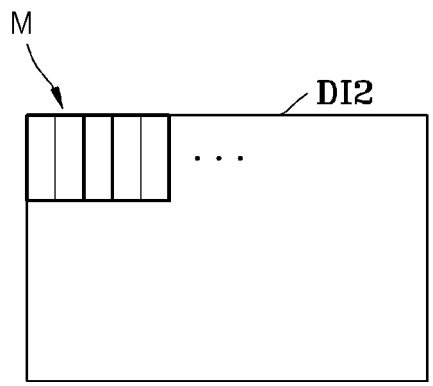
Figure 19C:
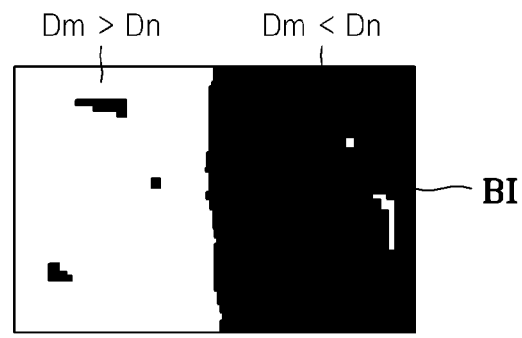

FIGS. 19A through 19C are diagrams illustrating processes of generating a binary-coded image BI, according to an embodiment of the invention. Referring to FIG. 19A, when the high frequency component of the pixels included in the mask region Dm of the first DoG image DI1 is greater than that of the second DoG image DI2, the reference pixel Pm is represented as the first brightness value. In addition, when the high frequency component of the pixels included in the mask region Dn of the second DoG image DI2 is greater than that of the first DoG image DI1, the reference pixel Pn is represented as the second brightness value. As described above, the process of comparing the high frequency components of the first and second DoG images DI1 and DI2 with each other is repeated for entire pixels of each of the first and second DoG images DI1 and DI2 while moving the 11×11 mask M one pixel at a time. As a result, the binary-coded image BI represented by the first and second brightness values may be obtained. Here, the first brightness value may be 255 level (white) and the second brightness value may be 0 level (black). Parts represented by the first brightness value correspond to the subject portion of the first image DI1, in which the subject is focused, since the high frequency component of the first DoG image DI1 is greater than that of the second DoG image DI2 and the clarity of the first image is greater than that of the second image. In addition, parts represented by the second brightness value correspond to the background portion of the second image, in which the background is focused, since the high frequency component of the second DoG image DI2 is greater than that of the first DoG image DI1 and the clarity of the second image is greater than that of the first image.

Figure 20A:
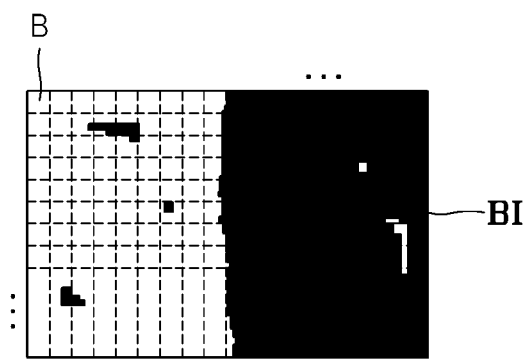
FIGS. 20A and 20B are diagrams illustrating processes of compensating for an error pixel, according to an embodiment of the invention.
Figure 20B:
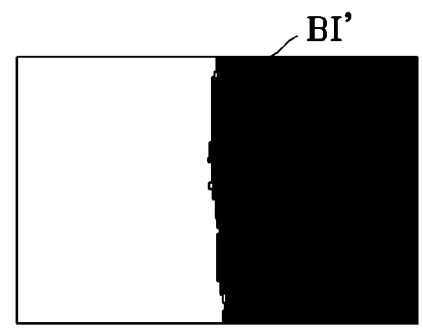

FIGS. 20A and 20B are diagrams illustrating processes of compensating for an error pixel, according to an embodiment of the invention. Referring to FIG. 20A, the binary-coded image BI is divided into a plurality of blocks B. For example, the number of the blocks B may be 32×32. If there are too many blocks B, it takes a lot of time to correct error pixels, and if the number of blocks B is too small, the boundary between the subject and the background becomes vague. When there are more pixels of the first brightness value than the pixels of the second brightness value in one block B, the pixels of the second brightness value in the one block B are converted to have the first brightness value. When there are more pixels of the second brightness value than the pixels of the first brightness value in one block B, the pixels of the first brightness value in the one block B are converted to have the second brightness value. That is, if there are more pixels of the first brightness value than those of the second brightness value in one block B, it is determined that the block is the subject portion, and the brightness values of the isolated pixels, of the second brightness value, are corrected. Therefore, a binary-coded image BI' in which the error pixels are corrected may be obtained. In this regard, the error pixel indicates that a pixel that must be a background part is indicated as a subject part or a pixel that must be the subject part is indicated as the background part. However, while performing the above processes, at the boundary between the subject portion and the background portion, the block B corresponding to the subject may be undesirably converted as the background or the block B corresponding to the background portion may be undesirably converted as the subject portion. Thus, a process of correcting the boundary between the subject and the background to prevent the above problem is performed.

Figure 21A:
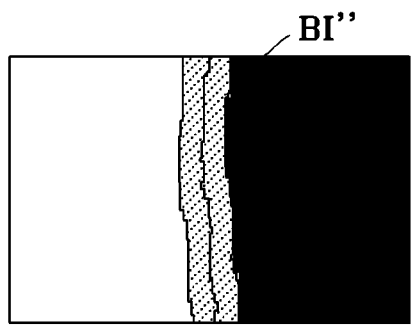
FIGS. 21A through 21D are diagrams illustrating processes of setting an unknown region, reducing the unknown region, and clarifying a boundary, according to an embodiment of the invention.

The boundary between the subject and the background and the peripheral region of the boundary are set as the unknown region in the binary-coded image BI. FIG. 21A illustrates the process of setting the unknown region according to the current embodiment of the invention. Referring to FIG. 21A, the boundary between the subject and the background and the peripheral region in the binary-coded image BI' in which the error pixels are corrected are set as the unknown region. The unknown region is converted to a third brightness value, which may be 150 level (gray). Thus, a binary-coded image BI" designating the unknown region is generated.

Figure 21B:
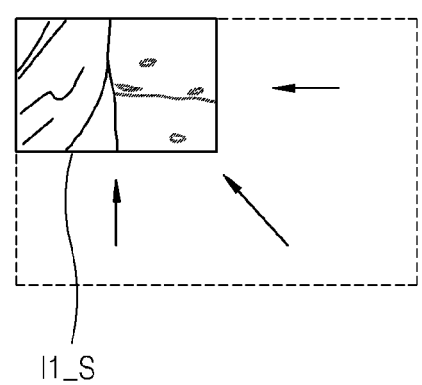
Figure 21C:
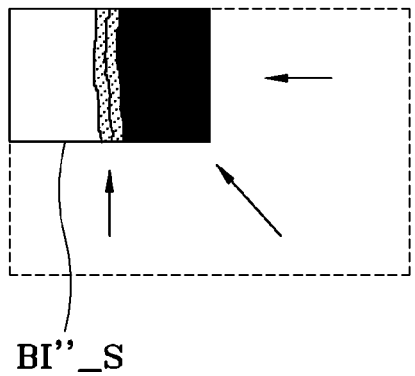

Referring to FIG. 21B, a first image I1_S is generated by reducing the first image I1 by the same ratio as that of reducing the unknown region. Further, referring to FIG. 21C, a binary-coded image BI"_S is generated by reducing the binary-coded image BI" by the same ratio as that of reducing the first image I1_S. For example, the binary-coded image BI" and the first image I1 may be respectively reduced by 0.25 times. It is determined whether the pixel included in the unknown region of the reduced binary-coded image BI"_S corresponds to the subject portion or the background portion by using image information of the pixel included in the reduced first image I1_S at the corresponding location as the pixel in the binary-coded image BI_S. As a result of determination, if the pixel included in the unknown region corresponds to the subject portion, the pixel is converted to have the first brightness value, and if the pixel included in the unknown region corresponds to the background portion, the pixel is converted to have the second brightness value. That is, each of the pixels in the unknown region is changed into the subject portion or the background portion by comparing the reduced binary-coded image with the reduced first image I1_S so as to finally reduce and eliminate the unknown region. Here, the image information of the pixel included in the first image I1_S may be the brightness value of the pixel or R (red), G (green), and B (blue) color information of the pixel. The above process of reducing the unknown region is repeatedly performed for the binary-coded image BI' and the first image I1 that are reduced by 0.25 times, the binary-coded image BI" and the first image I1 that are halved, and the binary-coded image BI" and the first image I1 having their original sizes.

Figure 21D:
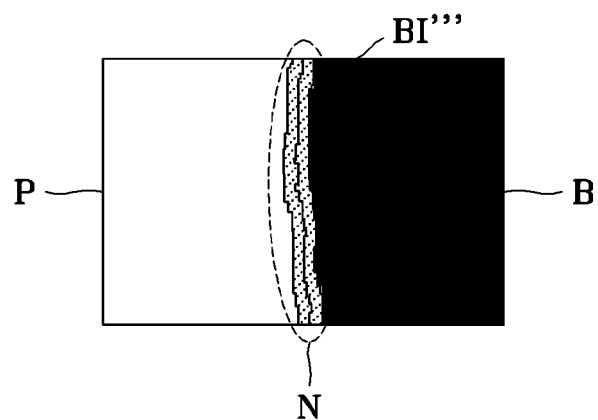

Therefore, the binary-coded image BI'" in which the unknown region is reduced and/or removed is generated as shown in FIG. 21D.

Figure 22A:
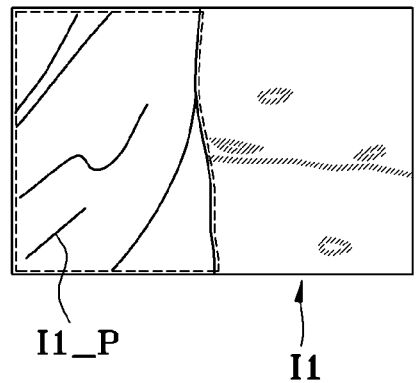
FIGS. 22A through 22C are diagrams illustrating processes of generating an out-of-focus image, according to an embodiment of the invention.
Figure 22B:
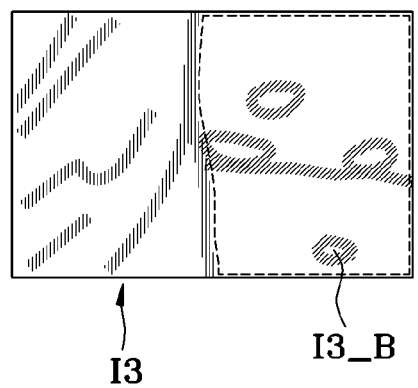

Referring to FIG. 21D, a subject portion P substitutes for a subject portion I1_P of the first image I1 of FIG. 22A, and a background portion B of the binary-coded image BI" substitutes for a background portion I3_B of the third image I3 of FIG. 22B to combine images.

More specifically, a pixel of the first image I1 located at the same position as the pixel included in the subject portion P of the binary-coded image BI" substitutes for the subject portion P of the binary-coded image 40. In addition, a pixel of the third image I3 located at the same position as the pixel included in the background portion B of the binary-coded image B" substitutes for the background portion B of the binary-coded image B". That is, the subject portion P of the first image I1 and the background portion B of the third image I3 are combined to generate the out-of-focus image. The first image I1, in which the subject is focused, and the third image I3, which is the super-macro image that is not focused, are combined with each other, and thus, the out-of-focus image desired by the user may be generated. According to the current embodiment of the invention, the images may be combined so that the boundary between the background and the subject may be naturally represented by alpha-blending the binary-coded image BI". Here, the alpha blending is a combination method for naturally combining the images by representing the boundary as the intermediate brightness between the brightness levels of the subject and the background.

Figure 22C:
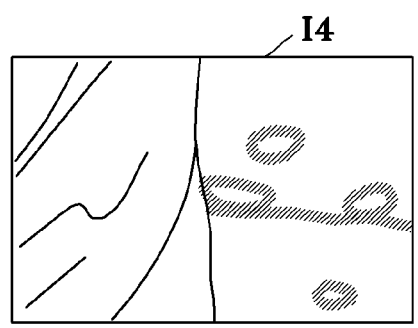

Therefore, an out-of-focus image I4 as shown in FIG. 22C may be generated. According to the image processing method of the current embodiment of the invention, the out-of-focus image I4 in which the subject portion is clear and the background is blurred is obtained.

According to embodiments of the invention, a subject distance is important to successfully obtain an out-of-focus image when the out-of-focus image is generated by AF bracketing photographing. Therefore, a user is notified of valid subject distance information when the out-of-focus image is generated by AF bracketing photographing, thereby increasing a success percentage of capturing the out-of-focus image.

According to the embodiments of the invention, an out-of-focus image is generated by combining a first image in which a subject is focused, a second image in which a background is focused, and a third image which is not focused. To obtain the out-of-focus image, a user is informed of subject distance information valid for obtaining the out-of-focus image according to a current zoom step, thereby increasing a probability of obtaining the out-of-focus image. Therefore, the user can obtain a desired out-of-focus image at an appropriate time.

Embodiments of the invention provide a digital image processing apparatus and a digital image processing method that effectively generate an out-of-focus image, and guide a user to properly generate the out-of-focus image at a time desired by the user, thereby increasing a probability of obtaining the out-of-focus image, irrespective of a physical difference of a lens or a photographing apparatus, and a recording medium storing the method.

In addition, other embodiments of the invention can also be implemented through computer readable code/instructions in/on a medium, e.g., a computer readable medium, to control at least one processing element to implement any above described embodiment. The medium can correspond to any medium/media permitting the storage and/or transmission of the computer readable code. The medium may be non-transitory.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the invention. The media may also be a distributed network, so that the computer readable code is stored/transferred and executed in a distributed fashion. Furthermore, the processing element could include a processor or a computer processor, and processing elements may be distributed and/or included in a single device.

While such terms as "first," "second," etc., may be used to describe various components, such components must not be limited to the above terms. The above terms are used only to distinguish one component from another.

The terms used in the current specification are merely used to describe particular embodiments, and are not intended to limit the invention. An expression used in the singular encompasses the expression of the plural, unless it has a clearly different meaning in the context. In the current specification, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Embodiments of the invention will be described below in more detail with reference to the accompanying drawings. Those components that are the same or are in correspondence are rendered the same reference numeral regardless of the figure number, and redundant explanations are omitted.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the invention.

All references, including publications, patent applications, and patents, cited herein are hereby incorporated by reference to the same extent as if each reference were individually and specifically indicated to be incorporated by reference and were set forth in its entirety herein.

What is claimed is:

1. A digital image processing apparatus comprising:
   a storage unit in which reference subject distance information used to perform out-of-focus image processing according to reference zoom information is stored;
   a zoom information obtaining unit configured to obtain zoom information;
   a reference subject distance information obtaining unit configured to obtain the reference subject distance information corresponding to the zoom information from the storage unit;
   a notification unit configured to notify a user via output notification information corresponding to the reference subject distance information;
   an image generating unit configured to generate a first image in which a subject is focused, a second image in which a background is focused, and a third image that is not focused;
   a setting unit configured to set a subject region and a background region of each of the first image and the second image;
   an out-of-focus image generating unit configured to generate an out-of-focus image by combining the subject region of the first image with the background region of the third image; and
   a first determining unit configured to determine whether the out-of-focus image can be generated by comparing contrast maps of the first image and the second image.

2. The digital image processing apparatus of claim 1, wherein the notification unit is configured to output first notification information indicating the reference subject distance information as a value.

3. The digital image processing apparatus of claim 1, wherein, if the first determining unit determines that the outof-focus image cannot be generated, the notification unit outputs second notification information including the reference subject distance information used to generate the out-of-focus image.

4. The digital image processing apparatus of claim 1, further comprising:
a subject distance information obtaining unit configured to obtain subject distance information; and
a second determining unit configured to compare the subject distance information with the reference subject distance information.

5. The digital image processing apparatus of claim 4, wherein the notification unit is further configured to output third notification information including guide information that guides a user to change the distance to the subject so that the subject distance information corresponds to the reference subject distance information, if the second determining unit determines that the subject distance information does not correspond to the reference subject distance information.

6. The digital image processing apparatus of claim 1, further comprising: a display unit configured to output the notification information as a user interface (UI) image and displaying the UI image.

7. The digital image processing apparatus of claim 1, further comprising: a speaker configured to output a sound notification corresponding to the notification information.

8. The digital image processing apparatus of claim 1, further comprising: a global motion compensator configured to compensate for global motion of the second and third images based on the first image.

9. A digital image processing apparatus comprising:
a storage unit in which reference subject distance information used to perform out-of-focus image processing according to reference zoom information is stored;
a zoom information obtaining unit configured to obtain zoom information;
a reference subject distance information obtaining unit configured to obtain the reference subject distance information corresponding to the zoom information from the storage unit;
a notification unit configured to notify a user via output notification information corresponding to the reference subject distance information;
an image generating unit configured to generate a first image in which a subject is focused, a second image in which a background is focused, and a third image that is not focused;
a setting unit configured to set a subject region and a background region of each of the first image and the second image, wherein the setting unit comprises:
a difference of Gaussian (DoG) image generator configured to generate a first DoG image and a second DoG image by applying a DoG filter to each of the first and second images;
a comparator configured to compare high frequency components in mask regions of the first and second DoG images, which respectively include reference pixels that are located at positions corresponding to each other;
a binary-coded image generator configured to generate a single binary-coded image by representing the reference pixels as a first brightness value if the high frequency component of the first DoG image is greater than that of the second DoG image, and to represent the reference pixels as a second brightness value if the high frequency component of the second DoG image is greater than that of the first DoG image; and
a subject/background region classification unit configured to classify a region indicating the first brightness value as the subject region and a region indicating the second brightness value as the background region; and
an out-of-focus image generating unit configured to generate an out-of-focus image by combining the subject region of the first image with the background region of the third image.

10. The digital image processing apparatus of claim 9, wherein the out-of-focus image generating unit is configured to combine a region of the first image corresponding to the subject region of the binary-coded image and a region of the third image corresponding to the background region of the binary-coded image.

11. A digital image processing method comprising:
obtaining zoom information;
obtaining reference subject distance information corresponding to the zoom information obtained from a database of reference subject distance information used to perform out-of-focus image processing according to reference zoom information;
notifying a user by outputting notification information corresponding to the reference subject distance information;
generating a first image in which a subject is focused, a second image in which a background is focused, and a third image that is not focused;
determining whether the out-of-focus image can be generated by comparing contrast maps of the first image and the second image;
setting a subject region and a background region of each of the first image and the second image; and
generating an out-of-focus image by combining the subject region of the first image with the background region of the third image.

12. The digital image processing method of claim 11, wherein the outputting of the notification information comprises: outputting first notification information indicating the reference subject distance information as a value.

13. The digital image processing method of claim 11, wherein, if the out-of-focus image cannot be generated as a result of first determination, the outputting of the notification information comprises: outputting second notification information including the reference subject distance information used to generate the out-of-focus image.

14. The digital image processing method of claim 11, further comprising:
obtaining subject distance information; and
secondly determining whether the subject distance information corresponds to the reference subject distance information.

15. The digital image processing method of claim 14, wherein, if the subject distance information does not correspond to the reference subject distance information as a result of second determination, the outputting of the notification information comprises: outputting third notification information including guide information that guides a user to change the distance to the subject so that the subject distance information corresponds to the reference subject distance information.

16. The digital image processing method of claim 11, wherein the outputting of the notification information further comprises:
outputting the notification information as a user interface (UI) image; and
displaying the UI image.

17. The digital image processing method of claim 11, wherein the outputting of the notification information further comprises:

outputting a sound notification corresponding to the notification information.

18. The digital image processing method of claim 11, further comprising:

compensating for global motion of the second and third images based on the first image.

19. A digital image processing method comprising:

obtaining zoom information;

obtaining reference subject distance information corresponding to the zoom information obtained from a database of reference subject distance information used to perform out-of-focus image processing according to reference zoom information;

notifying a user by outputting notification information corresponding to the reference subject distance information;

generating a first image in which a subject is focused, a second image in which a background is focused, and a third image that is not focused;

setting a subject region and a background region of each of the first image and the second image, wherein the setting of the subject region and the background region comprises:

generating a first DoG image and a second DoG image by applying a DoG filter to each of the first and second images;

comparing high frequency components in mask regions of the first and second DoG images, which respectively include reference pixels that are located at positions corresponding to each other;

generating a single binary-coded image by representing the reference pixels as a first brightness value if the high frequency component of the first DoG image is greater than that of the second DoG image, and representing the reference pixels as a second brightness value when the high frequency component of the second DoG image is greater than that of the first DoG image; and classifying a region indicating the first brightness value as the subject region and a region indicating the second brightness value as the background region; and generating an out-of-focus image by combining the subject region of the first image with the background region of the third image.

20. The digital image processing method of claim 19, wherein the generating of the out-of-focus image comprises:

combining a region of the first image corresponding to the subject region of the binary-coded image and a region of the third image corresponding to the background region of the binary-coded image.

21. A non-transitory computer program product, comprising a computer usable medium having a computer readable program code embodied therein, said computer readable program code adapted to be executed to implement a method, said method comprising:

obtaining zoom information;

obtaining reference subject distance information corresponding to the zoom information obtained from a database of reference subject distance information used to perform out-of-focus image processing according to reference zoom information;

outputting notification information corresponding to the reference subject distance information;

generating a first image in which a subject is focused, a second image in which a background is focused, and a third image that is not focused;

determining whether an out-of-focus image can be generated by comparing contrast maps of the first image and the second image;

setting a subject region and a background region of each of the first image and the second image; and generating an out-of-focus image by combining the subject region with the first image and combining the background region with the third image.

22. A digital image processing apparatus comprising:

an image generating unit configured to generate a first image in which a subject is focused, a second image in which a background is focused, and a third image that is not focused;

a setting unit configured to set a subject region and a background region of each of the first image and the second image;

an out-of-focus image generating unit configured to generate an out-of-focus image by combining the subject region of the first image with the background region of the third image; and a first determining unit configured to determine whether the out-of-focus image can be generated by comparing contrast maps of the first image and the second image.

* * * * *